United States Patent
Schulz et al.

(10) Patent No.: US 7,914,158 B2
(45) Date of Patent: Mar. 29, 2011

(54) OPTICAL ELEMENT WITH AN ANTI-FOG LAYER AND METHOD FOR ITS PRODUCTION

(75) Inventors: Ulrike Schulz, Jena (DE); Irmina Wendling, Jena (DE); Peter Munzert, Jena (DE); Norbert Kaiser, Jena (DE)

(73) Assignees: Fraunhofer-Gesellschaft zur Foerderung der angewandten Forschung e.V., Munich (DE); Friedrich-Schiller-Universitaet Jena, Jena (DE)

( * ) Notice: Subject to any disclaimer, the term of this patent is extended or adjusted under 35 U.S.C. 154(b) by 0 days.

(21) Appl. No.: 12/548,194

(22) Filed: Aug. 26, 2009

(65) Prior Publication Data

US 2010/0033819 A1 Feb. 11, 2010

Related U.S. Application Data

(63) Continuation of application No. PCT/DE2008/000267, filed on Feb. 11, 2008.

(30) Foreign Application Priority Data

Feb. 27, 2007 (DE) .......... 10 2007 009 512

(51) Int. Cl.
*G02B 1/00* (2006.01)
(52) U.S. Cl. ....................................... 359/507
(58) Field of Classification Search ............... 359/507
See application file for complete search history.

(56) References Cited

U.S. PATENT DOCUMENTS

| 4,252,843 | A | 2/1981 | Dorer et al. |
|---|---|---|---|
| 5,437,894 | A * | 8/1995 | Ogawa et al. ......... 427/535 |
| 6,932,482 | B2 | 8/2005 | Ukuda |
| 2003/0030909 | A1 | 2/2003 | Ukuda |
| 2003/0185973 | A1* | 10/2003 | Crawley et al. ......... 427/162 |
| 2004/0067339 | A1 | 4/2004 | Gandon et al. |
| 2004/0247899 | A1 | 12/2004 | Bier et al. |
| 2005/0233083 | A1 | 10/2005 | Schulz et al. |
| 2006/0046046 | A1 | 3/2006 | Wang et al. |

FOREIGN PATENT DOCUMENTS

| DE | 102 41 708 A1 | 3/2004 |
|---|---|---|
| EP | 0 429 009 B1 | 5/1991 |
| EP | 0 502 633 B1 | 9/1992 |
| EP | 0 871 046 A1 | 10/1998 |
| EP | 1 275 624 B1 | 1/2003 |
| EP | 0 782 015 B1 | 2/2003 |
| JP | 2001-074902 A | 3/2001 |
| JP | 2001-097744 A | 4/2001 |
| JP | 2003-206435 A | 7/2003 |
| JP | 2004-045671 A | 2/2004 |
| WO | WO 00/00855 | 1/2000 |

* cited by examiner

*Primary Examiner* — Euncha P Cherry
(74) *Attorney, Agent, or Firm* — Slater & Matsil, L.L.P.

(57) ABSTRACT

An optical element is provided with a fog reducing polymer layer. A reflection reducing nanostructure is formed on the surface of the fog reducing polymer layer.

24 Claims, 3 Drawing Sheets

OPTICAL ELEMENT WITH AN ANTI-FOG LAYER AND METHOD FOR ITS PRODUCTION This application is a continuation of co-pending International Application No. PCT/DE2008/000267, filed Feb. 11, 2008, which designated the United States and was not published in English, and which claims priority to German Application No. 10 2007 009 512.2 filed Feb. 27, 2007, both of which applications are incorporated herein by reference.

TECHNICAL FIELD

The invention relates to an optical element with an anti-fog layer and a method for its production.

BACKGROUND

With optical elements composed of glass or plastic, the problem often exists that in a moist environment, and in particular, with temperature changes, fog can form on the surface, whereby the transmission of the optical element is impaired.

For preventing fog on the surface of an optical element, the patent documents JP 2001/097744 A and EP 0782015 A2 disclose the application of a fog reducing polymer layer (anti-fog layer) on the optical element.

Fog reducing polymer layers, as a rule, contain strong hydrophilic polymers, which can absorb water, so that fine water droplets that develop with the condensation of water are absorbed by the layer within a short time.

Along with avoiding fog, with optical elements it is also desirable to reduce the reflection of the surface in order to achieve better transparency. For this, typically one or more thin antireflection layers are applied onto the optical element; the reflection reducing effect of the layers is based on optical interference.

An alternative method for reducing the reflection of plastic substrates is disclosed in German patent document DE 102 41 708 B4. With this method, a nanostructure is created on a surface of a substrate, composed of plastic, by means of a plasma etching process. Here, the nanostructure is produced by bombarding the substrate surface with energy rich ions, which are generated by means of a plasma ion source.

In order to reduce the fog as well as the reflection of the surface of an optical element, European document EP 0871046 A1 proposes to apply a porous oxide layer onto the fog reducing polymer layer; the thickness of the layer is selected to reduce reflection.

Furthermore, U.S. Patent Application Publication 2003/0030909 A1 proposes embedding a thin oxide layer between a comparatively thick fog reducing polymer layer and an additional thin fog reducing polymer layer. In both proposed solutions, an antireflection effect is achieved by means of the interference at the thin layers.

However, the application of one or more additional layers onto a fog reducing polymer layer can have the disadvantage that the water absorption of the polymer layer is impaired. Furthermore, with such an interference layer system, the problem can occur that optimal antireflection is not attained or undesired color impressions occur in the case of oblique light incidence.

SUMMARY

Aspects of the invention specify an improved optical element with a reflection and fog reducing coating, and a method for its production.

With an optical element according to embodiments of the invention that is provided with a fog reducing polymer layer (anti-fog layer), a reflection reducing nanostructure is formed on the surface of the fog reducing polymer layer.

The nanostructure created on the surface of the fog reducing polymer layer has the advantage, in particular, that it has a color neutral effect, including in the case of oblique light incidence, and has a good reflection reducing effect. Furthermore, the fog reducing effect is only marginally impaired by the nanostructure created on the surface of the fog reducing polymer layer.

The nanostructure on the surface of the fog reducing polymer, which can be created especially by means of a plasma etching method, advantageously extends from the surface of the fog reducing polymer layer up to a depth of 50 nm or more into the fog reducing polymer layer. In particular, the nanostructure preferably extends from the surface of the fog reducing polymer layer into the fog reducing polymer layer up to a depth of between 80 nm and 600 nm.

The fog reducing polymer layer is preferably a coat of lacquer, in particular, a coat of lacquer that can be thermally hardened or hardened by UV light.

The fog reducing polymer layer can contain, in particular, a polyurethane, a polyol, a poly(ethylene-alt-maleic acid), a siloxane, or an acrylate.

The thickness of the fog reducing polymer layer can preferably amount to between 1 μm up to and including 20 μm.

The optical element preferably contains a plastic or a glass. In the case of plastic, it can be, in particular, one of the polymers polymethylmethacrylate, polycarbonate, polyethersulfone, polycycloolefin, CR39, polyiourethane, polyethylene terephthalate (PET), or triacetylacetate (TAC).

The optical element can be, as examples, an optical lens, a spectacle lens, a shield, a surgical mask, a motorcycle helmet visor or a display covering. In particular, the optical element can be, for example in the case of a display covering, a film, for example, a PET film or a TAC film.

With a preferred embodiment of the invention, a transparent protective layer is applied onto the nanostructure. The transparent protective layer protects the created nanostructure from external effects, in particular, from mechanical damage, which can occur, for example, during cleaning of the surface.

The thickness of the transparent protective layer is preferably selected such that on the one hand, the nanostructure is sufficiently protected from outside influences, and on the other hand, the reflection reducing effect is not lost. In particular, the thickness of the transparent protective layer amounts preferably to between and including 10 nm and 50 nm.

A silicon oxide, in particular, $SiO_2$, is particularly suited for forming a transparent protective layer.

In a further preferred embodiment of the invention, a hydrophobic layer is applied onto the nanostructure, or, if a transparent protective layer was already applied, additionally applied on top of the transparent protective layer. The hydrophobic layer can contain an organic compound containing fluorine, for example, a fluoralkylsilane, or silicon. Due to the hydrophobic layer, a contact angle with respect to water of greater than 110°, in particular between 110° and 160°, can be attained. With the application of the hydrophobic layer, in particular, cleaning of the surface is facilitated.

The hydrophobic layer preferably has a thickness of 1 nm to 10 nm. Particularly preferably, the thickness of the hydrophobic layer is less than 5 nm.

With the method according to the invention for producing a reflection and fog reducing layer on the surface of an optical element, a fog reducing polymer layer is applied onto the surface of the optical element, then a thin layer is applied on the fog reducing polymer layer, and then a nanostructure is created at the surface of the fog reducing polymer layer by means of a plasma etching method.

Thus, the plasma etching procedure is performed through the previously applied thin layer, wherein the thin layer is completely or at least partially removed. The application of the thin layer before performing the plasma etching process has the advantage that in this way, a reflection reducing nanostructure can be produced also on fog reducing polymers, for which with the customary plasma etching process, this would be possible only with difficulty, or with a comparatively long treatment time. The duration of the plasma etching process preferably amounts to 400 seconds or less.

The thin layer, which is applied onto the fog reducing polymer layer before performing the plasma etching process, is preferably an oxide layer, a nitride layer or a fluoride layer. In particular, the thin layer can be a silicon oxide, silicon nitride, titanium oxide, or magnesium fluoride layer.

The thickness of the thin film preferably amounts to 2 nm or less, particularly preferably 1.5 nm or less. In the scope of the invention, the thickness of the thin layer is understood to be an average layer thickness, if the thin film is a non-continuous, in particular, an island-shaped, layer.

The application of the thin film is preferably performed by a PVD (physical vapor deposition) method, in particular, by sputtering or vacuum vaporization. For example, a dielectric oxide or nitride layer can be produced through reactive sputtering, in particular, magnetron sputtering, of a metal target.

The plasma etching process, which leads to the formation of the reflection reducing nanostructure in the fog reducing polymer layer, is preferably performed immediately after the application of the thin layer. Advantageously, the plasma etching process is performed advantageously using a plasma that contains oxygen. The plasma etching process is disclosed in the German patent document DE 102 41 708 B4, whose disclosed content concerning this matter is hereby incorporated by reference.

With a preferred embodiment of the method according to the invention, a transparent protective layer is applied onto the nanostructure, for example, a protective layer composed of silicon oxide. The thickness of the transparent protective layer amounts preferably to between and including 10 nm and 50 nm.

In a preferred embodiment of the invention, in a further method step, a hydrophobic layer is applied onto the nanostructure, or as the case may be, onto the previously created protective layer. The protective layer can contain, for example, silicon, or preferably, an organic material containing fluorine. The protective layer preferably has a layer thickness between 1 nm and 10 nm, particularly preferably less than 5 nm. The application of the hydrophobic layer is performed, for example, by vacuum coating, in particular, by thermal vaporization, or by dip coating.

The application of the hydrophobic layer has the advantage that the contact angle relative to the water is increased such that the surface created in this way has at least hydrophobic properties, particularly preferably even superhydrophobic properties. In particular, it can be achieved that the surface provided with the hydrophobic layer has a contact angle with respect to water of greater than 90°. The fog reducing effect of the fog reducing polymer layer is delayed only negligibly by the hydrophobic layer, for example, by about 5 seconds to a maximum of 30 seconds.

BRIEF DESCRIPTION OF THE DRAWINGS

The invention is described below in detail based on exemplary embodiments in conjunction with FIGS. 1 to 5.

Identical or equal acting elements are shown with the same labels in the Figures. The Figures are not to be regarded as true to scale; rather, individual elements can be represented in exaggerated size for clarification.

DETAILED DESCRIPTION OF ILLUSTRATIVE EMBODIMENTS

Figure 1A:
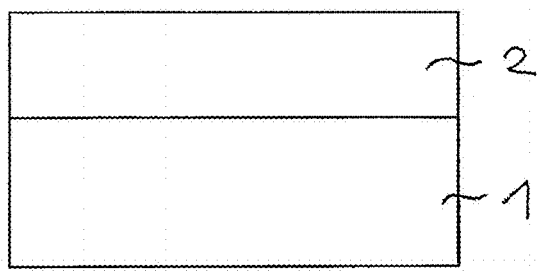
FIGS. 1A, 1B and 1C show a schematic representation of an exemplary embodiment of the method according to the invention based on intermediate steps.

As represented in FIG. 1A, in a first intermediate step of a method according to the invention, a fog reducing polymer layer 2 is applied onto an optical element 1. The optical element 1 is composed, for example, of glass or plastic, in particular, of polymethylmethacrylate, polycarbonate, polyethersulfone, polycycloolefin, CR39, polyiourethane, polyethylene terephthalate (PET), or triacetylacetate (TAC).

The fog reducing polymer layer 2 typically has a thickness of about 1 μm to 20 μm.

The fog reducing polymer layer 2 is preferably a coat of lacquer, for example, a coat of lacquer that can be thermally hardened, or hardened by UV light, which contains, for example, a polyurethane, a polyol, a poly(ethylene-alt-maleic acid), a siloxane or an acrylate. The application of the fog reducing polymer layer 2 can occur, for example, using vacuum vaporization or alternatively by dip coating.

Figure 1B:
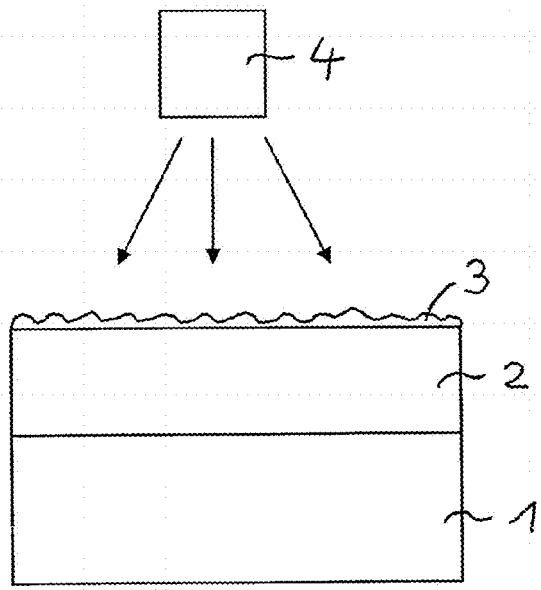

In the method step represented in FIG. 1B, a thin layer 3 is applied onto the fog reducing polymer layer 2. The thin layer 3 is preferably an oxide layer, a nitride layer or a fluoride layer. For example, thin layers composed of $TiO_2$, $SiO_2$, $MgF_2$ or a silicon nitride are suitable.

The thin layer 3 is preferably an island-shaped layer, that is, a layer whose growth was discontinued in the initial stage, such that the layer is not yet grown together into a continuous layer.

The thin layer 3 preferably has a thickness of about 2 nm or less, particularly preferably, about 1.5 nm or less. Here, the thickness of the thin layer 3 is understood to be an averaged thickness over the surface of the fog reducing polymer layer 2, because the thin layer 3 can be, in particular, an island-shaped layer. The averaged thickness of the thin layer 3 can be determined during the growth, for example, with a calibrated oscillating quartz measurement system, wherein the averaged layer thickness is calculated from the applied mass. The averaged thickness of the island-shaped thin layer corresponds to the thickness of a cohesive layer with uniform thickness, which has the same mass as the actually applied island-shaped layer.

The application of the thin layer 3 occurs, for example, through vacuum vaporization from a vaporization source 4. In particular, the vaporization source 4 can be an electron beam vaporization source or a thermal vaporization source. Alternatively, other PVD methods can also be used for applying the thin layer 3. In particular, application through sputtering, for example, through reactive magnetron sputtering, is suitable. The application of the thin layer 3 by means of sputtering has the advantage that comparatively large surfaces can also be coated with the thin layer 3. For example, it is also possible to coat larger optical elements 1 with a size of, for example, about 50 cm×50 cm or more.

Figure 1C:
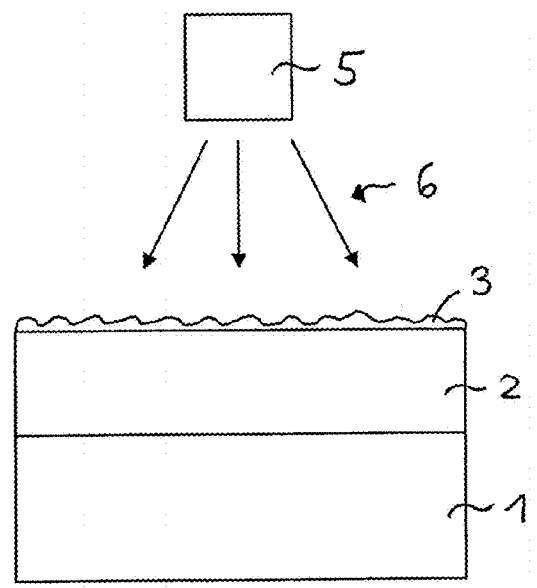

Subsequently, as represented in FIG. 1C, a plasma etching process is performed for creating a nanostructure in the fog reducing polymer layer 2. Here, the plasma etching occurs through the preferably island-shaped thin layer 3. The plasma etching method is preferably performed at a substrate temperature of less than about 100° C. In order for the plasma 6 to cause a material removal of the fog reducing polymer layer, a plasma power of preferably greater than about 100 W is used.

A plasma ion source 5 is used, for example, for creating the plasma 6. In particular, the plasma can be an argon plasma, to which oxygen is supplied. In the plasma 6, high energy ions are accelerated toward the substrate, and in this way, create the nanostructure. A suitable plasma ion source 5 and suitable operating parameters for performing the plasma etching process are disclosed, for example, in the German patent document DE 102 41 708 B4 which is incorporated herein by reference, and therefore, are not described in more detail here. Instead of the plasma ion source described in the state of the art, which is typically used in vacuum vaporization systems for thermal and/or electron beam vaporization, the plasma etching process can also be performed with other plasma sources. For example, a high frequency plasma source is also suitable, which can be disposed as an etching station in a sputtering system.

Figure 2:
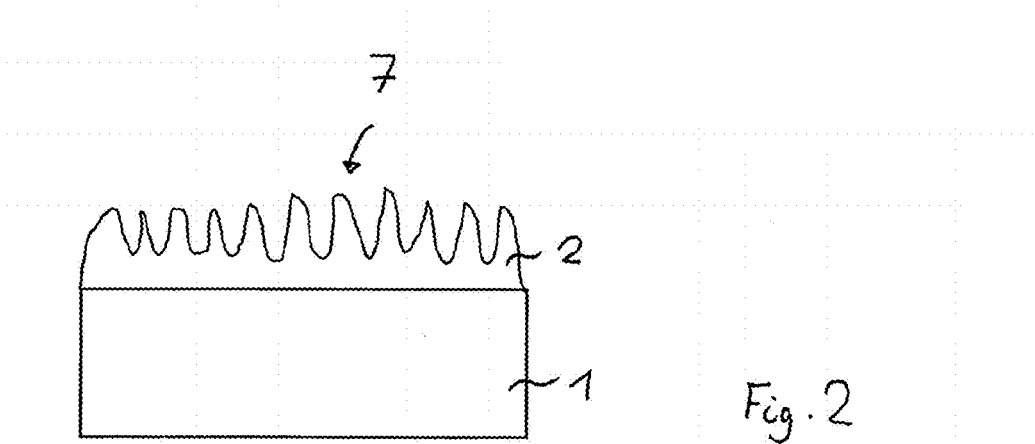
FIG. 2 shows a schematic representation of an optical element according to an exemplary embodiment of the invention.

The optical element 1 according to a first exemplary embodiment of the invention, represented in FIG. 2, which has a fog reducing polymer layer 2 on whose surface a reflection reducing nanostructure 7 is formed, is produced in this manner. The previously applied thin layer has been completely or at least partially removed from the surface of the fog reducing polymer layer 2 during the plasma etching process. The nanostructure 7 extends preferably from the surface of the fog reducing polymer layer 2 up to a depth of more than about 50 nm into the polymer layer 2. Particularly preferably, the nanostructure 7 extends even up to a depth of about 100 nm or more into the fog reducing polymer layer 2. The structure sizes of the nanostructure 7 in the lateral direction preferably amount to about 70 nm or less, that is, a comparatively high aspect ratio is attained.

Figure 3:
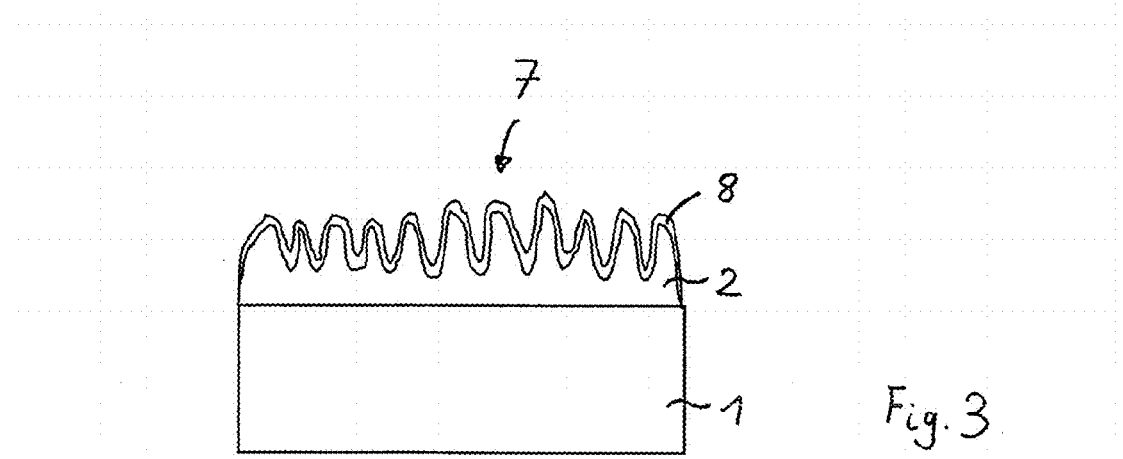
FIG. 3 shows a schematic representation of an optical element according to a further exemplary embodiment of the invention.

In a preferred embodiment of the invention, as represented in FIG. 3, after creating the nanostructure 7, a transparent protective layer 8 is applied onto the nanostructure 7. By means of the transparent protective layer 8, the nanostructure 7 is protected from external influences, in particular, from mechanical damage. This reduces, in particular, the risk that the nanostructure 7 is damaged during cleaning of the optical element 1. The surface provided with the nanostructure 7 can, after application of the protective layer 8, be wiped, for example, with a cloth, and in particular, can be cleaned with ethanol without mechanical damage of the nanostructure.

The reflection reducing effect of the created nanostructure 7 is not at all, or only negligibly impaired by the transparent protective layer 8, if the layer thickness does not exceed about 50 nm, particularly preferably about 40 nm. Therefore, the transparent protective layer 8 preferably has a thickness between, and including, about 10 nm and including about 50 nm.

In order not to impair the reflection reducing effect of the nanostructure 7, it is further advantageous if the transparent protective layer 8 has a low refractive index. Preferably, the transparent protective layer 8 is an $SiO_2$ layer.

Figure 4:
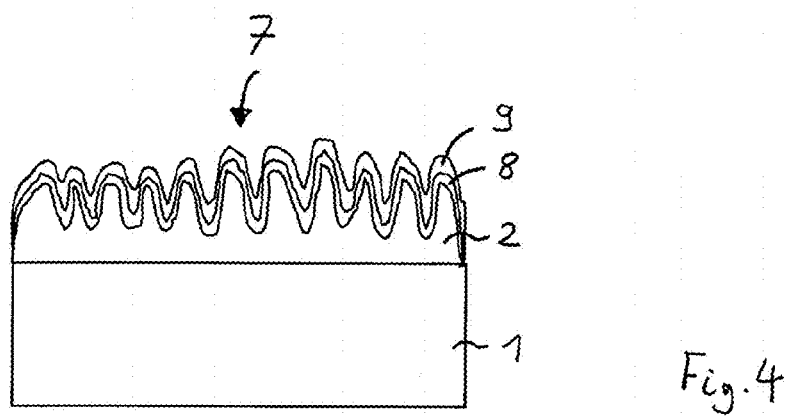
FIG. 4 shows a schematic representation of an optical element according to a further exemplary embodiment of the invention.

In a further exemplary embodiment of the invention, as represented in FIG. 4, a hydrophobic layer 9 is additionally applied onto the transparent protective layer 8. The hydrophobic layer 9 is preferably a very thin layer with a thickness between about 1 nm and about 10 nm, particularly preferably, a thickness of less than about 5 nm. Due to the hydrophobic layer 9, in particular, the cleaning of the surface provided with the nanostructure is facilitated.

Figure 5:
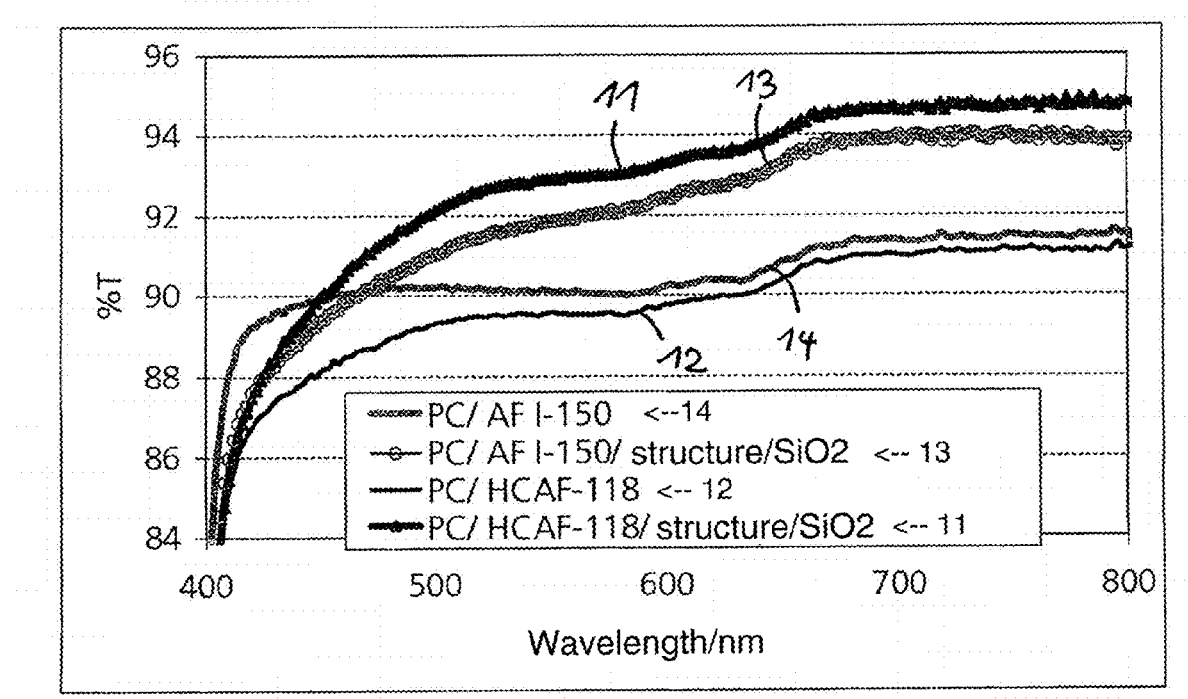
FIG. 5 shows the transmission depending on the wavelength for two optical elements according to the exemplary embodiments of the invention, compared to two customary optical elements.

In FIG. 5, the transmission of two samples, each having a fog reducing polymer layer, is represented in each case before and after the creation of a nanostructure according to the invention on the surface of the fog reducing layer.

Curve 12 represents the measured transmission of a first sample before the creation of the nanostructure. The first sample is a polycarbonate disk, on which an 8 μm thick fog reducing polymer layer composed of the polymer HFAD-118 (Exxene Corporation) is applied.

Curve 11 shows the measured transmission of the first sample after performing the method according to the invention for creating a nanostructure on the surface of the fog reducing layer. The comparison shows that the transmission in the visible spectral region (430 nm to 700 nm) was increased after the production of the nanostructure (curve 11) by up to 3.5% compared to the untreated sample (curve 12). The remaining reflection of the sample in the wavelength region of 420 nm to 700 nm amounts to less than 1% after the creation of the nanostructure. Low transmission losses due to scattering occur only with wavelengths of less than 450 nm, and are not detectable by the human eye. Even with oblique incident light, the surface appears color neutral and without reflection.

The production of the first sample occurs through the application of an 8 μm thick layer of fog reducing polymer HFAC-118 onto the polycarbonate disk by means of dip coating.

Subsequently, for creating the nanostructure, a dielectric layer of less than 2 nm composed of $TiO_2$ was applied onto the fog reducing polymer layer. The creation of the nanostructure occurred by means of a plasma source of the type APS from the Leybold Optics Company with an etching time of 180 s in an argon/oxygen plasma. There, argon was admitted into the vacuum chamber with a flow rate of 14 sccm, and oxygen was admitted with a flow rate of 30 sccm. The operation of the plasma source takes place with a bias voltage of 120 V with a discharge current of plasma of 50 A.

After creating the nanostructure, a 40 nm thick transparent protective layer composed of $SiO_2$ was applied by means of electron beam vaporization. Due to the simultaneous operation of the ion source with a bias voltage of 120 V with a plasma discharge current of 50 A, the protective layer was highly compressed during growth.

Further, in FIG. 5, the measured transmission is represented as a function of the wavelength for a second sample, in which a polycarbonate disk was coated with an 8 μm thick polymer layer composed of the fog reducing polymer AFI-150 (Exxene Corporation). Curve 14 represents the transmission before the creation of a nanostructure, and curve 13 represents the transmission after the creation of the nanostructure with the method according to the invention.

With the second sample, for producing the nanostructure a 1 nm thick $SiO_2$ layer was first applied onto the fog reducing polymer layer using magnetron sputtering. In this case, the plasma etching process was performed in the plasma of a magnetron sputtering system with an etching time of 300 seconds. The further method steps correspond to the previously described example.

The comparison of curves 13 and 14 shows that also with the second sample, transmission in the visible spectral region was significantly increased due to the formation of the nanostructure on the surface of the fog reducing polymer layer 2.

With the two samples already described, no fog was detected after storing the sample at −6° C., and a subsequent transfer to 20° C. with 70% humidity. Also, no fog appeared after breathing onto the sample after storage at −2° C.

Furthermore, the samples according to the exemplary embodiments of the invention have advantageously proven to have a high mechanical stability. Thus, in an abrasion test of the samples 1 and 2, which have a nanostructure provided with a protective layer, with a cloth with a load of 5N (according to DIN ISO 9211-4), no visible damage was detected even after 100 repetitions.

In a further exemplary embodiment, samples which were produced in the manner of the mentioned sample 1 were additionally coated with a fluorine-containing organic material by means of vacuum coating through thermal vaporization after the production of the nanostructure and the application of the protective layer.

The materials WR2™ from the Merck Company, or Everclean™ from the Umicore Company were used as a starting material for the thermal vaporization. Here, the layer thickness of the applied layers amounted to less than 5 nm. It was determined that due to the subsequent application of such a hydrophobic layer the fog reducing effect of the fog reducing polymer layer was delayed only by approximately 5 s to 30 s. In this case, the indicated time relates to the time until achieving a transmission of more than 85% after storage at −6° C. and a transfer to 20° C. with 70% humidity. The same results were achieved after storage at −2° C., with breathing onto the samples.

Furthermore, it was determined that after the application of the hydrophobic layer, the samples have a contact angle of more than 110°, that is, superhydrophobic properties.

Thus, the coating produced in this way is distinguished advantageously by the fact that it acts anti-reflecting as well as fog reducing, and furthermore, is hydrophobic and highly stable mechanically.

The invention is not limited by the description based on the exemplary embodiments. Rather, the invention comprises each new feature, as well as any combination of features, which includes, in particular, every combination of features in the patent claims, even if this feature or this combination itself is not explicitly specified in the patent claims or exemplary embodiments.

What is claimed is:

1. An optical component comprising:
an optical element;
a fog reducing polymer layer; and
a reflection reducing nanostructure formed at a surface of the fog reducing polymer layer, wherein the nanostructure extends from the surface of the fog reducing polymer layer to a depth of 50 nm or more into the fog reducing polymer layer.

2. The optical component according to claim 1, wherein the nanostructure is created by means of a plasma etching method.

3. The optical component according to claim 1, wherein the nanostructure extends from the surface of the fog reducing polymer layer to a depth of between 80 nm and 600 nm into the fog reducing polymer layer.

4. The optical component according to claim 1, wherein the fog reducing polymer layer comprises a coat of lacquer.

5. The optical component according to claim 1, wherein the fog reducing polymer layer comprises a polyurethane, a polyol, a poly(ethylene-alt-maleic acid), a siloxane, or an acrylate.

6. The optical component according to claim 1, wherein the fog reducing polymer layer has a thickness of 1 μm up to 20 μm.

7. The optical component according to claim 1, wherein the optical element comprises a plastic, wherein the plastic comprises a polymer selected from the group consisting of polymethylmethacrylate, polycarbonate, polyethersulfone, polycycloolefin, CR39, polyiourethane, polyethylene terephthalate, and triacetylacetate.

8. An optical component comprising:
an optical element;
a fog reducing polymer layer;
a reflection reducing nanostructure formed at a surface of the fog reducing polymer layer; and
a transparent protective layer over the nanostructure.

9. The optical component according to claim 8, wherein the transparent protective layer has a thickness between 10 nm and 50 nm.

10. The optical component according to claim 1, further comprising a hydrophobic layer over the nanostructure.

11. The optical component according to claim 10, wherein the hydrophobic layer comprises silicon or a fluorine-containing organic material.

12. The optical component according to claim 10, wherein the hydrophobic layer has a thickness between 1 nm and 10 nm.

13. A method for producing a reflection and fog reducing polymer layer on a surface of an optical element, the method comprising:
forming a fog reducing polymer layer over the surface of the optical element;
forming a thin layer over the fog reducing polymer layer; and
subsequently forming a nanostructure by means of a plasma etching method on a surface of the fog reducing polymer layer.

14. The method according to claim 13, wherein the thin layer comprises an oxide layer, a nitride layer or a fluoride layer.

15. The method according to claim 14, wherein the thin layer comprises silicon oxide, silicon nitride, titanium oxide, or magnesium fluoride.

16. The method according to claim 13, wherein the thin layer has an average thickness of 2 nm or less.

17. The method according to claim 13, wherein the thin layer comprises an island shaped layer.

18. The method according to claim 13, wherein the nanostructure extends from the surface of the fog reducing polymer layer to a depth of 50 nm or more into the fog reducing polymer layer.

19. The method according to claim 18, wherein the nanostructure extends from the surface of the fog reducing polymer layer to a depth of between 80 nm and 600 nm into the fog reducing polymer layer.

20. The method according to claim 13, further comprising forming a transparent protective layer over the nanostructure.

21. The method according to claim 20, wherein the transparent protective layer has a thickness between about 10 nm and 50 nm.

22. The method according to claim 13, further comprising forming a hydrophobic layer over the nanostructure.

23. The method according to claim 22, wherein the hydrophobic layer comprises silicon or a fluorine-containing organic material.

24. The method according to claim 22, wherein the hydrophobic layer has a thickness between 1 nm and 10 nm.

* * * * *